United States Patent [19]
Lee

[11] Patent Number: 4,716,949
[45] Date of Patent: * Jan. 5, 1988

[54] ANTISKID TRACTION DEVICE

[76] Inventor: Suk R. Lee, 9126 N. Keating Ave., Skokie, Ill. 60077

[*] Notice: The portion of the term of this patent subsequent to May 5, 2004 has been disclaimed.

[21] Appl. No.: 813,683

[22] Filed: Dec. 27, 1985

Related U.S. Application Data

[63] Continuation-in-part of Ser. No. 741,527, Jun. 5, 1985, Pat. No. 4,662,417.

[51] Int. Cl.$^4$ ............................................. B60C 27/20
[52] U.S. Cl. ................................. 152/216; 152/221; 152/225 C; 152/230
[58] Field of Search ............... 192/225 R, 225 C, 226, 192/229, 213 R, 216, 217, 218, 221, 222, 230; 24/68 TT, 71 TT

[56] References Cited
U.S. PATENT DOCUMENTS 1,719,746  7/1929  Baker .................................. 152/222
2,586,049  2/1952  Jacobs ................................. 152/217
2,963,064 12/1960  Rucker ................................ 152/218

Primary Examiner—Donald E. Czaja
Assistant Examiner—Thomas Bokan
Attorney, Agent, or Firm—Birch, Stewart, Kolasch & Birch

[57] ABSTRACT

An antiskid traction device adapted to be attached to vehicle tires which comprises a right side frame member having a locking pin, a left side frame member having a pivotable locking member adapted to engage the locking pin, at least two antiskid members disposed at each of the end portions of the right and left side frames, the antiskid members being provided with a plurality of studs thereon for improving the traction thereof, and an adjusting member for changing the length of at least one of the antiskid members so that the device can be adjusted for all tire sizes.

8 Claims, 7 Drawing Figures

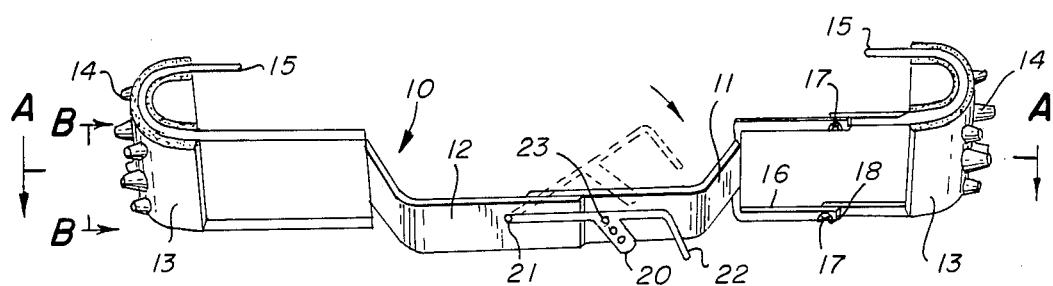
FIG. 1
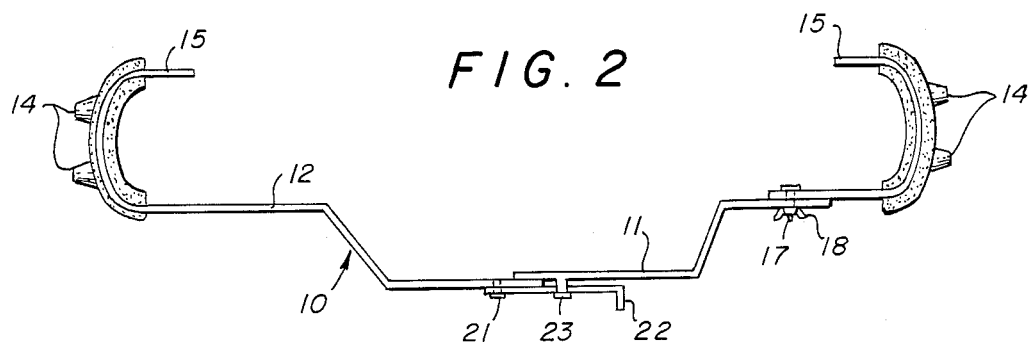
FIG. 2
FIG. 3
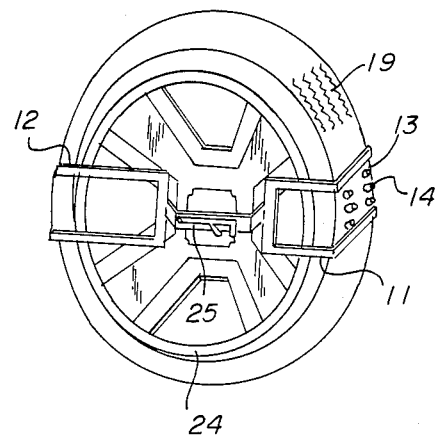
FIG. 4
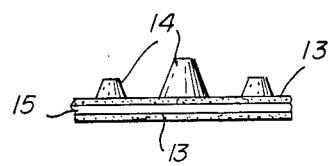
FIG. 5
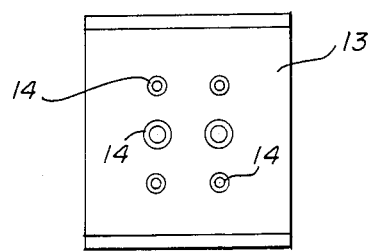

ANTISKID TRACTION DEVICE

BACKGROUND AND FIELD OF THE INVENTION

This application is a continuation-in-part of Application Ser. No. 741,527 filed June 5, 1985, now U.S. Pat. No. 4,662,417, for ANTISKID TRACTION DEVICE.

The present invention relates to an antiskid traction device for automobiles, and more particularly to an improved antiskid traction attachment for vehicle wheels.

Various antiskid traction devices are well known in the art, as exampified by U.S. Pat. No. 944,772 to Chaloner, U.S. Pat. No. 1,719,746 to Baker and U.S. Pat. No. 4,402,357 to Granryd. However, none of these patents provide antiskid traction devices which are attached to tires without using the rims or radiating spokes, and which obtain improved traction efficiency while following the contour of the tire.

OBJECTS AND SUMMARY OF THE INVENTION

Accordingly, it is an object of the present invention to provide an improved antiskid traction device which is attached to tires.

Another object of the present invention is to provide an antiskid traction attachment for a vehicle tire which can be readily attached to the outside of the vehicle wheel.

It is a further object of the invention to provide an antiskid traction device having a plurality of specialized antiskidding members which are effective in obtaining an improved traction efficiency.

It is still another object of the present invention to provide an antiskid traction device having at least four antiskid members which is effective in achieving a stronger attachment of the device to the tire and in addition achieve a better antiskid function.

It is still another object of the present invention to provide an antiskid traction device having a length-adjusting member for causing the device to follow the contour of the vehicle tire.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The antiskid traction device of the present invention comprises an antiskid member having a plurality of studs which provide traction for vehicle wheels, a locking member which is utilized at the outside of the wheels and an adjustment member for causing the device to follow the contour of a vehicle tire whereby the traction device of the present invention enhances the traction and gripping power on ice, snow, curves, and the like. In a particular feature of the present invention, the antiskid device can be easily installed and removed from the tire.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a perspective view of the antiskid traction device of the present invention;

FIG. 2 is a cross-sectional view of the antiskid traction device of FIG. 1, taken along line A—A of FIG. 1;

FIG. 3 is a perspective view of the antiskid traction device of the present invention attached to the tire of the vehicle;

FIG. 4 is a cross-sectional view of the studs taken along line B—B of FIG. 1;

FIG. 5 is a plan (top) view of the antiskid member, showing the size of the studs;

DETAILED DESCRIPTION OF THE INVENTION

Figure 6:
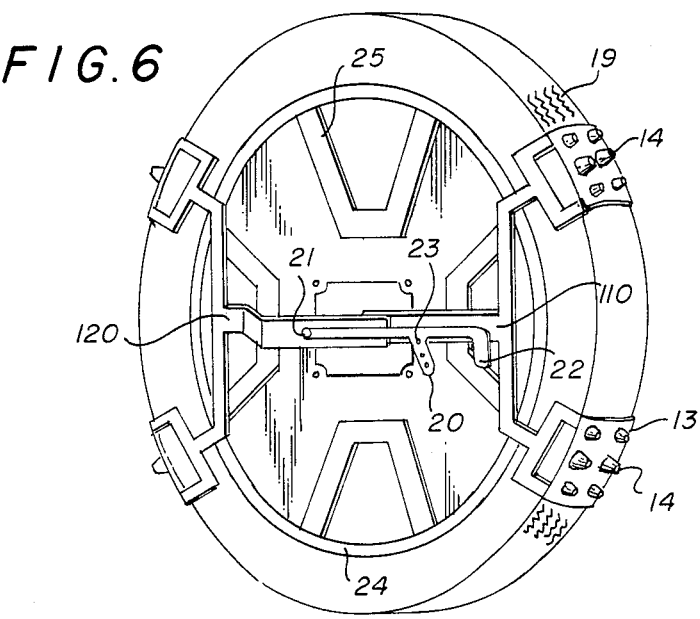
FIG. 6 is a perspective view of the antiskid traction device of the present invention having four antiskid members attached to the tire of the vehicle.

Referring now to the drawings, for the purpose of illustrating the present invention, the antiskid traction device 10 as shown in FIGS. 1, 2 and 3, comprises a right side frame 11, a left side frame 12 and antiskid members 13 disposed at the end portions of said right and left side frames 11 and 12 for providing antiskid and traction for vehicle wheels.

The antiskid members 13 made of rubber, plastic, or the like have a plurality of studs 14 attached thereto. That stud which is disposed at the middle of the antiskid member 13 has a height and size which is about two times the height and size of the adjacent studs for improving the traction efficiency as shown in FIGS. 4 and 5. The frames 11 and 12 are made of metallic materials having flexible and lightweight properties, and are provided with hard flexible edges 15 disposed at the ends thereof. The edges pass through the antiskid members 13 for fixing the antiskid members 13 to the frames 11 and 12. The hard flexible edge 15 are adapted to tightly engage the tire 19.

The right side frame 11 extends to the hard flexible edge 15 through a separate and additional length-adjusting member which is formed by a plurality of grooves 16, bolts 17 and nuts 18 for enabling the traction device to be adjusted to the contour of the vehicle. The left side frame 12 has a locking handle 22 disposed at the L-shaped end portion thereof and having a locking member 20 containing a plurality of holes obliquely disposed thereon which mate with a pin 23 having a big head and disposed at the L-shaped end portion of the right side frame 11. The locking handle 22 is pivoted at pivot point 21 disposed at the end of the left side frame 12. When the right and left frames 11 and 12 are engaged with each other, the device 10 has a C-shaped configuration.

As shown in FIG. 4, the studs at the middle of member 13 are about two times the height of the studs at both sides thereof, e.g., about 1 inch in height. Also, the bottom diameter of the middle studs is about two times that of the side studs, e.g., about 1 inch in height, as shown in FIG. 5. Thus, studs are formed at the plate portions 13 of the ends thereof in order to increase the traction (FIG. 4).

Figure 7:
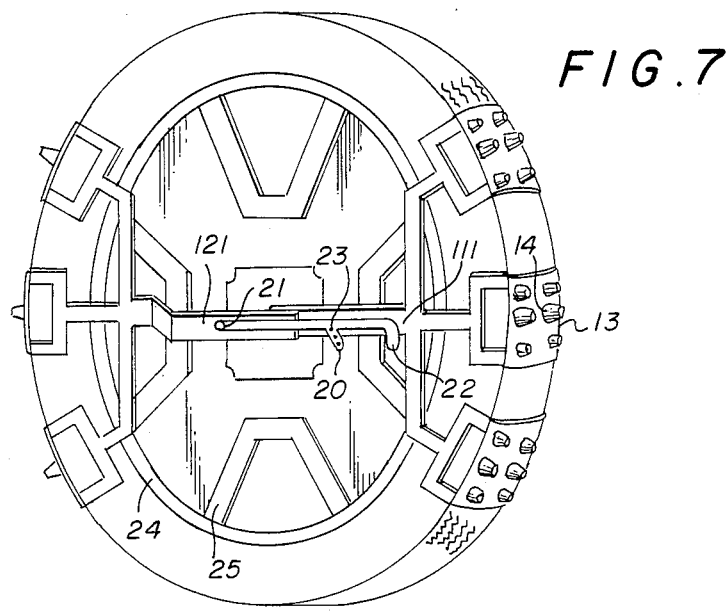
FIG. 7 is a perspective view of the antiskid traction device having six antiskid members attached to the tire of the vehicle.

FIGS. 6 and 7 show additional embodiments of the antiskid traction device having an increased number of antiskid members secured thereon. Such a device having for example, at least four antiskid members is effective in achieving a stronger attachment of the device to the tire and in addition achieves a better antiskid function by providing more frictional contact with the ground. In FIG. 6 the left side frame 120 and right side frame 110 extend into two additional antiskid members 13 and in FIG. 7 the left side frame 121 and right side frame 111 extend into four additional antiskid members 13. It is understood that additional antiskid members can be provided as needed.

In operation, first of all, the user approximates the diameter of the driving wheel for utilizing the antiskid traction device of the present invention and separately and additionally adjusts the length thereof through the length-adjusting members 16, 17 and 18. Then the device 10 of the present invention is attached to the desired vehicle wheel by applying the hard flexible edges 15 to the inside of the tire 19 without using the rim 24 on the wheel 25 and pushing the locking handle 22 to the bottom until the antiskid device of the present invention is completely secured. At that time, one of the holes obliquely disposed on the locking member 20 is matched with the pin 23 and the locking member 20 is locked. When releasing the antiskid device, the procedure is reversed and the antiskid traction device of the present invention is removed from the tires of the vehicle.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An antiskid traction device adapted to be attached to vehicle tires for use in adverse driving conditions which comprises:
   a right side frame member having a locking pin,
   a left side frame member having a pivotal locking member with multiple locking positions for engagement with said locking pin whereby the combined length of the right and left side frame members can be varied,
   at least two antiskid members disposed at each of the radial outer end portions of the right and left side frame members, said antiskid members being provided with a plurality of studs thereon for improving the traction thereof, said studs disposed at the middle of the antiskid member being longer than those disposed above the side thereof, and
   means for separately and additionally adjusting the length of said right side frame member whereby the device can be further adjusted for all tire sizes.

2. The antiskid traction device of claim 1, wherein the means for separately and additionally adjusting the length comprises a plurality of grooves, bolts and nuts.

3. The antiskid traction device of claim 1, wherein the studs disposed at the middle of the antiskid member are about double the length of the studs on the sides thereof.

4. The antiskid traction device of claim 3, wherein the studs in the middle of the antiskid member are about 1 inch in diameter and about 1 inch in height.

5. The antiskid traction device of claim 1, wherein the studs are formed on a plate.

6. The antiskid traction device of claim 1, wherein the total number of antiskid members is four.

7. The antiskid traction device of claim 1, wherein the total number of antiskid members is six.

8. The antiskid traction device of claim 1, wherein the right and left side frame members combined to form a C-shaped configuration which facilitates the attachment of the locking member to the locking pin.

* * * * *